Nov. 9, 1937.　　G. L. MOREHEAD　　2,098,463
SLUDGE COLLECTOR
Filed Aug. 6, 1935　　5 Sheets-Sheet 1
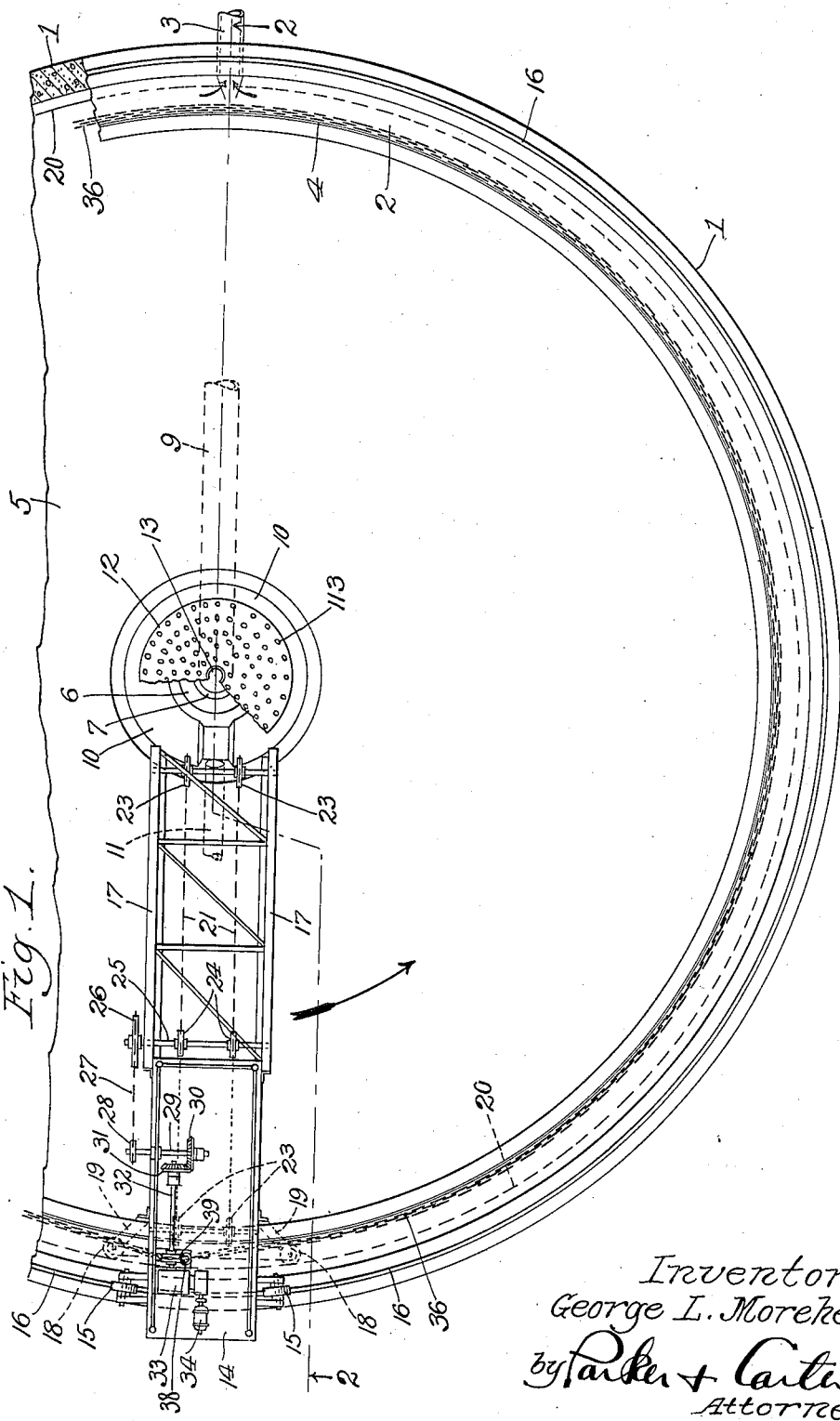
Inventor
George L. Morehead
by Parker + Carter
Attorneys.

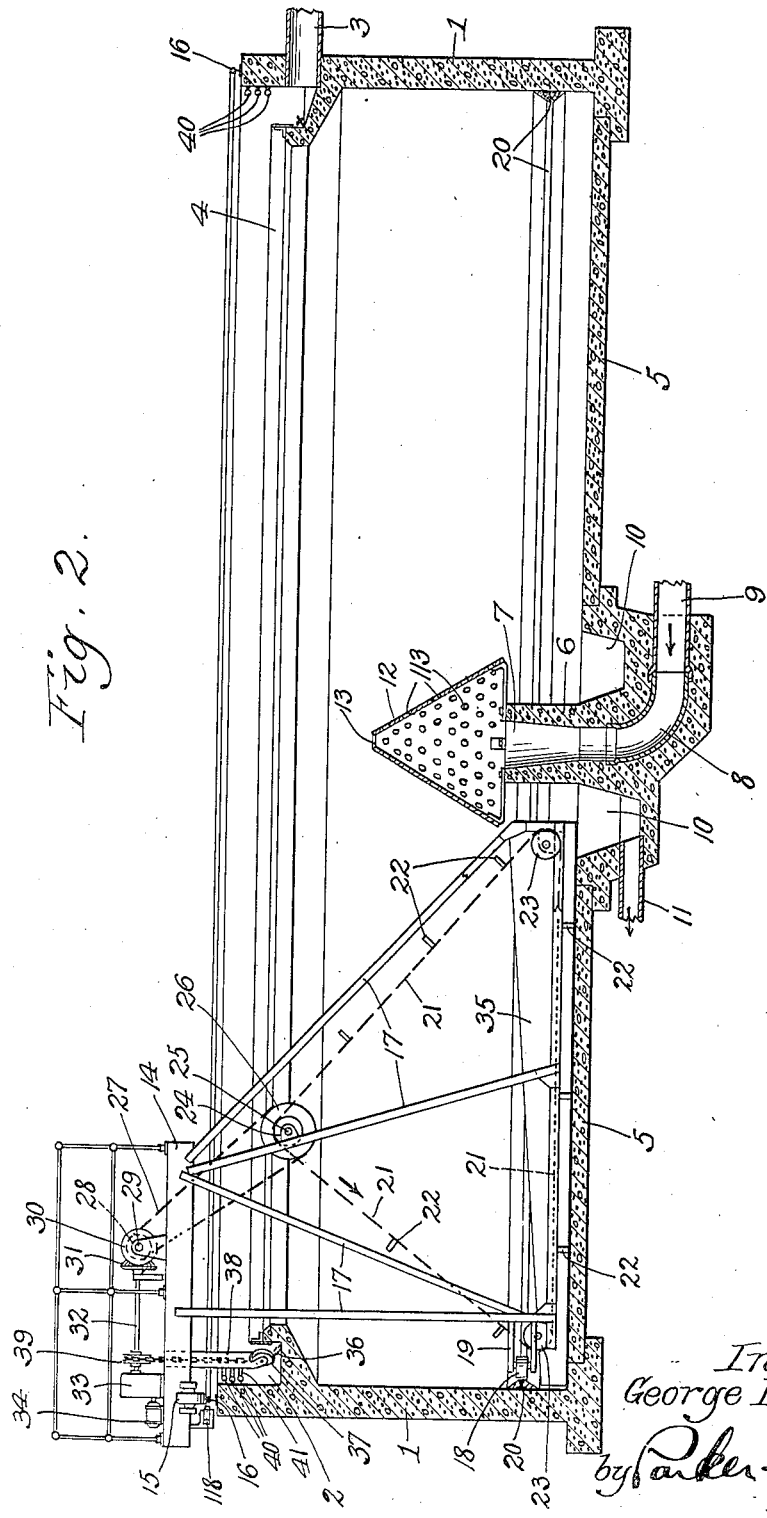

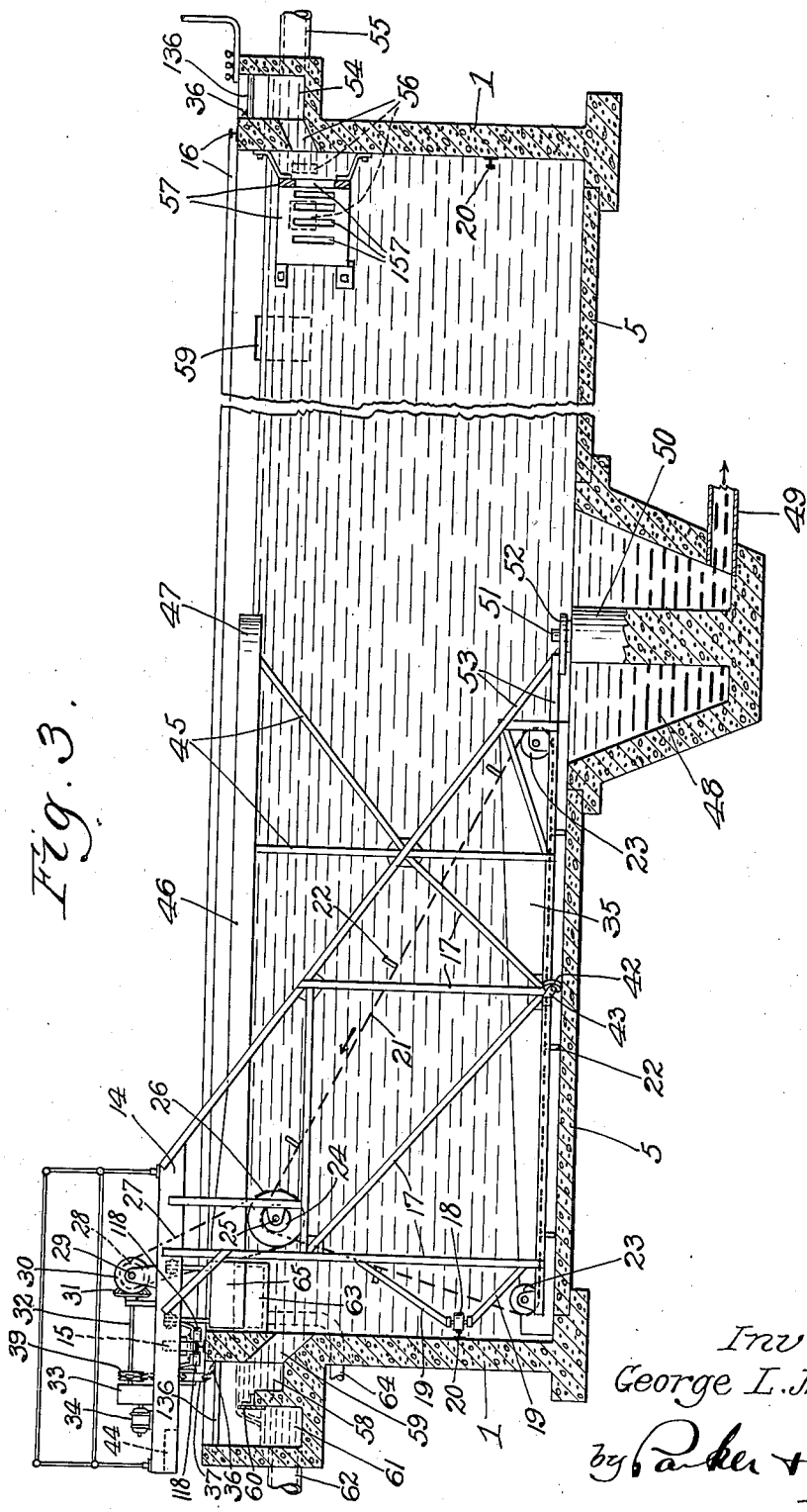

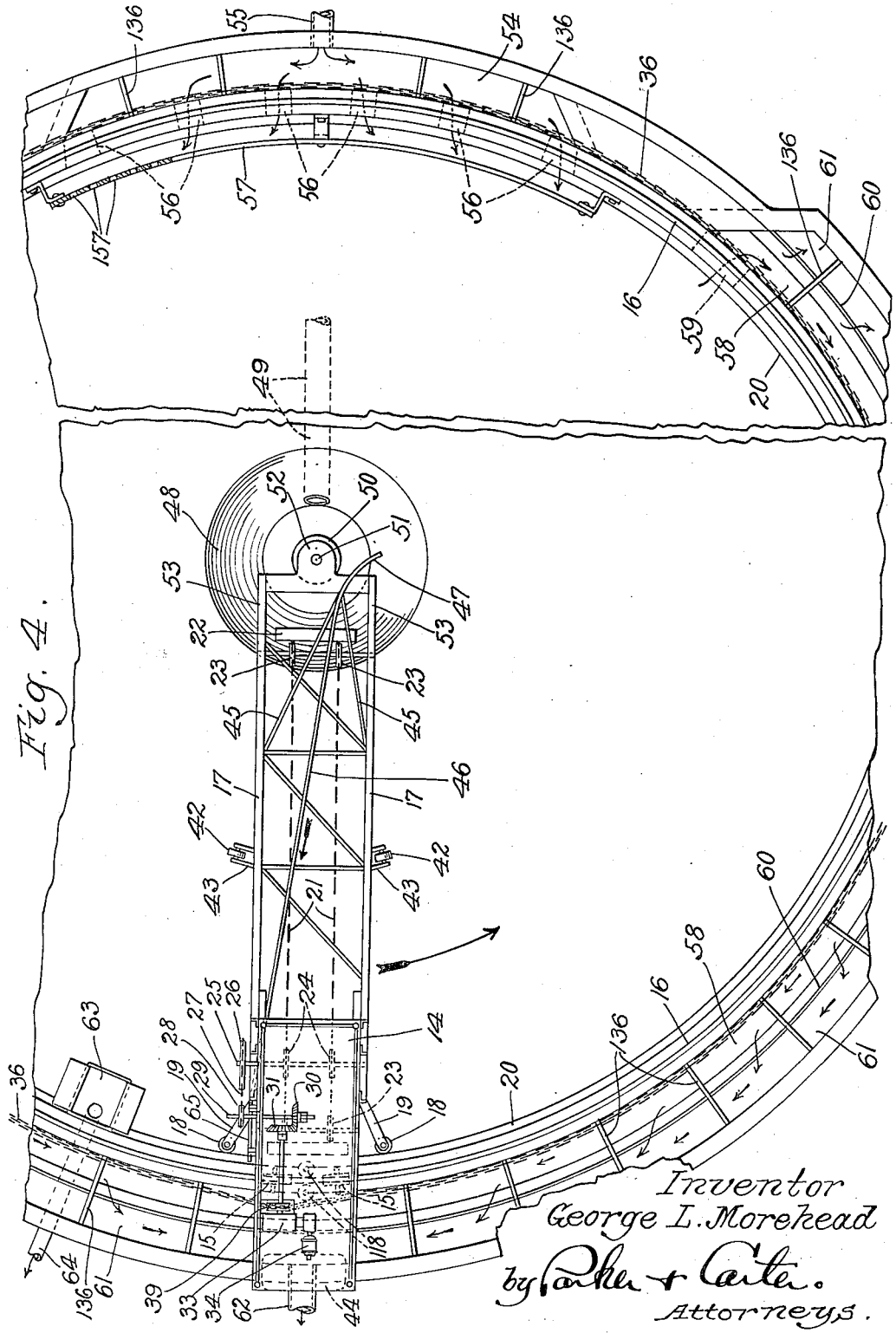

Nov. 9, 1937.  G. L. MOREHEAD  2,098,463
SLUDGE COLLECTOR
Filed Aug. 6, 1935  5 Sheets-Sheet 5
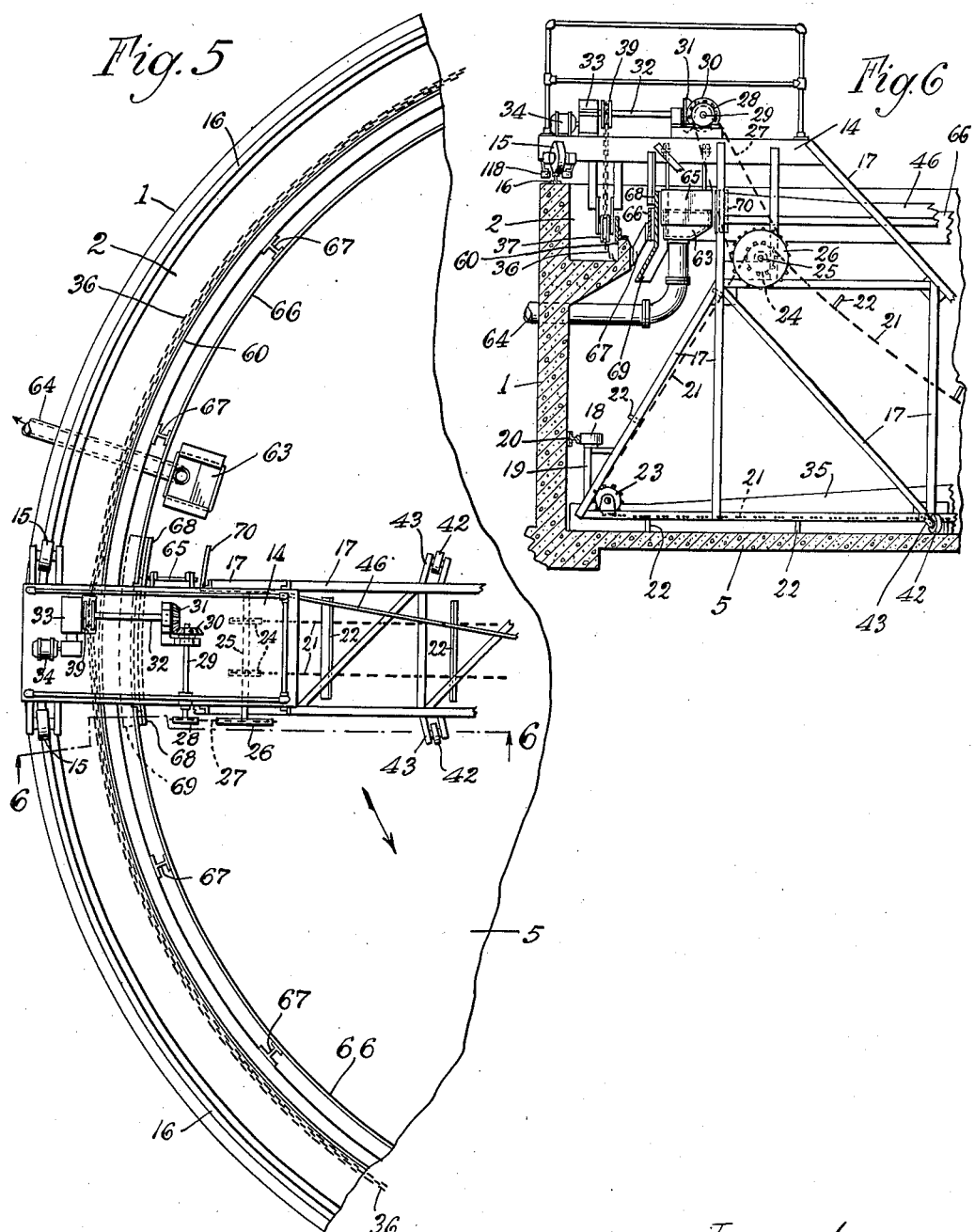
Inventor
George L. Morehead
by Parker Carter
Attorneys Patented Nov. 9, 1937

2,098,463

UNITED STATES PATENT OFFICE 2,098,463

SLUDGE COLLECTOR

George L. Morehead, Philadelphia, Pa., assignor to Link-Belt Company, Chicago, Ill., a corporation of Illinois Application August 6, 1935, Serial No. 34,944

14 Claims. (Cl. 210—3)

This invention relates to material conveying means and in the form illustrated herewith is particularly adapted for association with a sewage treatment tank in which means are provided for moving the sludge which may have settled in the tank to a point of discharge. Means may also be provided for moving scum which is floating upon the surface of the liquid within the tank.

An object of the invention is, therefore, to provide a conveying assembly which may be moved about the tank to convey sludge and which may additionally carry a scum collecting means or conveyor. Another object of the invention is to provide means for supporting such conveying assembly entirely upon the side wall of the tank. Another object of the invention is to provide a conveying assembly and means for mounting it in and for movement about the tank without any supporting contact with the bottom of the tank. Another object of the invention is therefore to provide in a plant for the treatment of sewage and liquid wastes, means for permitting solids to settle to the bottom and to rise to the surface and for removing each of them from the tank.

Other objects will appear from time to time in the specification and claims.

The invention is illustrated more or less diagrammatically in the accompanying drawings, wherein—

Figure 1 is a plan view showing one form of the conveying assembly in place;

Figure 2 is a transverse vertical section taken at line 2—2 of Figure 1;

Figure 3 is a view generally similar to Figure 2;

Figure 4 is a partial plan view showing the modified conveying assembly of Figure 3 in plan;

Figure 5 is a plan view illustrating a modified form; and

Figure 6 is a transverse vertical section taken at line 6—6 of Figure 5.

Like parts are designated by like characters throughout the specification and drawings.

As shown the conveying assembly of the invention is mounted in a round tank having side wall 1, about the inner face of which, toward the top, is an effluent or overflow trough 2 having a discharge 3 and preferably having an adjustable weir plate 4, which may be raised or lowered. The tank is provided with a floor or bottom 5 and with an influent member 6 provided with a preferably flaring influent passage 7 which, by means of an elbow 8, is connected with an influent conduit or pipe 9. A sludge hopper or trough of generally annular shape 10 is provided centrally of the tank and about the member 6. It may have a sludge draw-off connection 11. The influent nozzle or opening may be of almost any desired shape. As shown herewith, as above pointed out, it flares slightly and may have mounted upon it an inverted, generally conical baffle 12 which is open at its upper end as at 13, and may be perforated as at 113.

The conveying assembly comprises a bridge member 14 supported on rollers 15 which may or may not be flanged and which run upon an annular track 16 which is concentric with the tank and mounted upon the wall 1. Depending downwardly from the member 14 is a supporting framework 17 formed of suitable members and carrying adjacent its lower edge, preferably two lower guide rollers 18, which may be supported from the frame 17 by brackets 19, which contact a track 20 fixed about the inner face of the wall 1 adjacent its bottom. The conveyor assembly is thus in effect a cantilever structure supported on the upper track 16 and bearing against the lower track 18. 118 are horizontal rollers.

As a means for conveying material toward the sludge hopper a conveyor formed of a pair of chains 21 and carrying transverse flights 22 is driven in the direction of the arrow in Figure 2 about two pairs of lower sprockets 23 supported on the framework 17. The conveyor chains 21 are driven by driving sprockets 24 mounted upon a shaft 25 which carries at one end a sprocket 26 driven through a chain 27 from a driving sprocket 28 which is mounted upon a shaft 29. This shaft carries a beveled gear 30 which meshes with a second beveled gear 31 on a shaft 32 which latter is driven by a reduction gear 33. A motor 34 drives the gear.

The conveyor just described, when it is in motion moves the material generally radially and discharges it into the sludge hopper. The framework 17 in the form shown, may carry a sludge plow 35 which, as the conveyor moves about the tank, contacts and carries the sludge with it and thus the sludge picked up by the plow 35 is discharged into the sludge hopper by the flights 22 on the chain 21.

While many means may be used for moving the entire conveyor assembly about the tank, the form illustrated in the figures herewith comprises an endless chain 36 which in Figures 1 and 2 lies in the overflow trough 2. This chain is led about a roller 37, through the hollow member 38 about a pocketed wheel 39 on the shaft 32. Thus rotation of that shaft carrying the wheel causes the conveyor assembly to be moved around the tank by its engagement with the chain 36. In the modified form of Figures 3 and 4 bars 136 extending across the influent and effluent channels may be added to support the endless chain 36.

It is usually convenient to drive the mechanism described by an electric motor and as one convenient means for delivering current to that motor there are mounted about the inner face of the tank wall 1 and toward its top a plurality of current collectors 40. The current is picked up by contacts 41, one for each of the collectors 40. These contacts are preferably mounted upon the hollow member 38 and by any suitable wiring, not herein shown, carry the current to the motor. Thus no matter what the position of the conveyor assembly the collectors are always in contact with the pick-up members on the tube 38 and the motor is always in circuit.

In the form of the invention shown in Figures 3 and 4 a slightly different arrangement of tank, sump, and collector is shown. Instead of having the central influent passage the influent enters near the surface of the liquid along a portion of the side wall, and may be discharged over a weir extending along a portion of the side wall and tank, but this arrangement necessitates certain changes in the construction of the tank which differentiate it from that shown in Figures 1 and 2. The general arrangement of the conveying assembly is, however, similar to that described above, except for certain structural details which will now be described.

The form of the tank shown in Figures 3 and 4 has on top of the side wall a track 16 upon which a main member 14 is supported by rollers 15. As in the case of the earlier described conveyor assembly there is a supporting structure 17 formed of suitable structural members, which structure depends from the main bridge member. A track or rail 20 is positioned on the inner face of the wall 1 toward its bottom and the guide rollers 18 engage this track, being carried from the supporting frame 17 by brackets 19. A conveyor, which is essentially the same as that described above in connection with Figures 1 and 2 is included in the form of the device shown in Figures 3 and 4. The conveying assembly may or may not be provided with casters or other rollers 42 supported in any suitable brackets 43 or mounted directly under the assembly. Ordinarily these will not be necessary as the entire weight of the conveyor assembly will be carried from the tank wall, the structural supports and conveyor assembly constituting a cantilever structure supported from the wall. To assist in balancing a counter-weight 44 may or may not be mounted upon the outer end of the bridge.

Upon the supporting framework 17 may be mounted additional supporting parts 45 and upon these is carried a scum plow 46 which extends from approximately the outer edge of the tank toward the center. It may extend slightly beyond the center or may stop slightly short of the center, which although it lies generally radially with respect to the tank, may be slightly displaced from a true radius as shown in plan in Figure 4 and may have its inner end curved as at 47, that is to say, curved in the direction of rotation of the conveyor assembly, which direction is indicated by the arrow in Figure 4.

The tank itself is provided in its bottom, and preferably centrally, with a sludge hopper 48 from which there is a draw-off or discharge connection 49 through which sludge may be removed.

Electric current may be supplied to the motor by a trolley connection in the form generally shown in Figures 1 and 2 or otherwise and the assembly is preferably moved about the tank by means of the endless chain 36, as described in connection with Figures 1 and 2.

The conveyor assembly of Figures 3 and 4 will ordinarily center itself and keep itself properly centered by means of the rollers 15 and 18. It is to be noticed that the rollers 18 are set outside of the boundary of the bridge structure so that they are farther apart than the rollers 15. However, it may be desirable for some conditions to add a centering means and for that purpose the central column 50 may be provided. It carries a centering or pivot pin 51 which engages with a centering plate 52 carried on an extension 53 from the framework 17.

As above mentioned, the tank in the form shown in Figures 3 and 4 differs somewhat from that shown in Figures 2 and 3 although the conveying assembly shown in any of the figures may be used with any of the tanks shown and with a large variety of other possible tanks not here shown.

In the tank of Figures 3 and 4 there is positioned about a portion of its periphery an influent trough 54 into which sewage to be treated is introduced through a conduit 55. The trough 54 is provided with one or more openings or ports 56 discharging into the tank. A baffle 57, slotted at 157 is positioned within the tank opposite the inlet ports 56 to serve as a baffle and a diffuser for the inflowing liquid.

Throughout a portion of the circumference of the tank there is located an annular trough 58 which is in communication with the tank through ports 59. The trough 58 may be provided with an adjustable weir 60 to provide an even withdrawal flow of liquid. Positioned outside the trough 58 is a final overflow influent trough 61 from which a discharge connection or conduit 62 leads.

Where the scum plow is used, means are provided for discharging the scum and this may take the form of a relatively small scum trough or hopper 63, positioned within the tank. A scum discharge pipe 64 leads from the trough or hopper 63. The scum trough lies within the path of the scum plow 46. To permit the plow to clear the trough 63 the plow is provided with a hinged section 65 shown particularly in Figure 3. This section hangs downward of its own weight and forms a continuation of the scum plow 46 at all times except when it contacts the hopper, 63. Then it swings upward as the plow moves over and past the hopper and at that time the hinged section merely wipes across the top scum hopper, serving to scrape the scum in front of it into the hopper.

As shown in Figures 5 and 6 one or more scum baffles may be associated with the supporting bridge member 14. These scum baffles have been omitted from the form of the device shown in Figures 3 and 4 although they may be used with that form and in ordinary practice would be. They have been omitted to avoid confusion in the showing of the structural details of those figures. They have been shown, however, in Figures 5 and 6. The construction of Figures 5 and 6 differs, therefore, from that of Figures 3 and 4 mainly in the showing of the scum baffles supported from the bridge 14 and which therefore move with it, and in the showing of a fixed scum baffle about the tank.

The shape and arrangement of the tank are substantially the same as that shown in Figures 3 and 4 but a fixed scum baffle 66 is carried by supports 67 from the wall of the tank. It is of course concentric with the tank.

Mounted on the bridge 14 or supported from it, and positioned generally at the outer end of the scum plow 46 is a preferably curved scum baffle 68 which may be provided with an outwardly bent portion 69. This scum baffle lies just inside of the fixed scum baffle 66 and passes between it and the scum box 63, as shown particularly in Figure 6. The baffle 68 is preferably curved concentrically with the fixed scum baffle 66. Positioned adjacent the baffle 68 is a second scum baffle 70 which is separated from the baffle 68 by a distance approximately equal to the width of the scum box 63, measured in a radial direction. Thus when the conveying assembly passes over the scum box the baffle 68 is on one side of it and the baffle 70 is on the other, so that the scum box or hopper is embraced by the two baffles and thus when the hinged section 65 of the plow 46 swings backwardly and upwardly to clear the scum box or trough there is no chance for scum to escape because it is held and guided into the scum box, partly by the baffles 68 and 70 and partly by the hinged section 65 and since the moving baffles 68 and 70 extend substantially below the surface, the scum, at the moment of discharge into the box or trough 63, is not sufficiently stirred up to become mixed with the cleared effluent. It is important to notice in this connection that the portion 69 of the baffle 68 extends well below the surface of the water and below the path of the effluent. The baffle 70 extends somewhat below the water surface and preferably somewhat below the lower edge of the scum plow 46, but in practice ordinarily it is satisfactory to have the baffle 70 extend down into the water a shorter distance than the baffle 68.

An important advantage of the movable baffle 69 is that it prevents accumulated scum from passing under the fixed baffle 66. In a settling tank where the scum is moved towards the tank edge a considerable amount of fluid material, including scum, is often carried below a stationary baffle, such as the baffle 66 and the efficiency of the tank is thereby decreased. The installation of the deep traveling baffle 69 overcomes this disadvantage and permits the use of a fixed baffle of lesser depth than would otherwise be necessary.

The use and operation of this invention are as follows:

In either form of the device, in use the driving motor rotates the pocketed wheels and endless chain encircling the tank and moves the entire assembly along the tank wall. Since the assembly includes a blade or plow adjacent the bottom of the tank, when the assembly is moved about the tank this blade sweeps the bottom and moves material ahead of it. Associated with the blade or plow in both forms of the invention, is a conveyor arranged to move material preferably toward the center of the tank and discharge it into the sludge hopper. Thus as the assembly moves about the tank material is swept up and moved along in front of the blade and simultaneously the chain and flight conveyor operates to move the collected material into the sludge hopper.

In the first form of the device shown herein there is no skimming mechanism. In the form of the device shown, however, in Figures 3 and 4, there is a skimming blade or plow carried by the moving assembly and positioned to skim floating material from the surface of the liquid within the tank. Thus the combined effect is to skim material from the surface of the liquid within the tank and discharge it into a hopper and also to sweep and collect material from the bottom of the tank and discharge it into a hopper in the bottom of the tank.

In the form shown in Figures 3 and 4 the scum plow 46 is so inclined with respect to the direction of movement that as it moves about the tank it collects the scum near the periphery of the tank and into the scum hopper or trough 63 or into whatever scum removing means is provided. It will be understood that the invention is not limited to the combination with a scum hopper or trough. For some purposes other types of scum hopper or trough may be used in the combination shown or the scum hopper or trough may be omitted entirely and the scum, after a sufficient quantity has accumulated along the blade or plow 46, and adjacent the edge of the tank, will be dipped out or otherwise removed by hand. Whatever the final means for scum removal, the assembly includes means for sweeping scum from the surface of the liquid and for retaining it adjacent the periphery of the tank until disposed of.

In the form of the invention shown in Figures 1 and 2, the movable assembly is not supported from the floor of the tank, although parts of it are sufficiently close to the floor of the tank to sweep it. The assembly is supported entirely from the tank wall, its weight being carried in part upon the rollers 15, which run on the track 16, on the top of the wall, and in part upon the rollers 18, which run on the track 20 on the inner face of the wall. The bridge and supporting structure of the moving assembly thus forms a cantilever structure carried by the wall and extending over the floor to or near the center of the tank. The guide rollers 118 assist in centering and preventing displacement of the rollers from the track 16. In this form of the invention the movable assembly is thus supported, guided and centered entirely by its contact with tracks positioned on the wall of the tank and while it projects radially inwardly toward the center of the tank it is not in contact with the tank floor.

In the modified form of the invention shown in Figures 3 and 4 the bridge assembly is supported generally in the same manner as that described in connection with the first two figures with the exception that it may additionally be provided with rollers 42 which may contact the floor of the tank to run upon it or upon a track laid in the floor and as an additional means for centering the assembly a portion of it may engage the member 51 which is positioned centrally of the tank and generally on a level with the floor. Ordinarily this member carries no appreciable part of the weight of the movable assembly and serves only as a centering means.

The use and operation of the form of the device shown in Figures 5 and 6 is generally the same as that shown in the earlier figures. The scum plow 46, as the conveying assembly moves about the tank, moves scum from the center toward the edge of the tank and scum which has been moved toward the edge is retained in the space between the baffle 68 and the scum plow 46 and so is moved about the tank, but is collected and held together. When the fixed scum box or trough 63 is encountered, the baffle 68 moves on one side of it and extending well below the surface prevents loss of the scum and also prevents mixing of the scum with the liquid generally and particularly with the effluent liquid. The baffle 70 passes close to the box 63 on the side opposite the baffle 68 and so serves additionally to prevent spilling and mixing of the scum and the hinged baffle 65 contacts the box or trough 63, swings rearwardly and upwardly and guides and wipes the scum into the trough. Thus scum is first collected, then held together in the collected condition and finally discharged into the scum trough.

I claim:

1. In combination in a circular tank adapted to contain liquid, having a relatively flat floor means for supplying liquid to it and for withdrawing liquid from it, and means for removing solid matter from the tank, said means comprising a movably mounted conveying assembly supported upon the tank and means for rotating it bodily about the tank, supported above the floor of the tank, a sludge trough situated in the floor of the tank, and a scum hopper mounted adjacent the liquid level of the tank and adjacent its wall, the conveying assembly carrying means to move material to the trough in the floor of the tank said last mentioned means including a conveyor mounted for relative movement with respect to the remainder of said conveying assembly, and means for giving it such relative movement.

2. In combination in a generally circular tank having a wall and adapted to contain liquid, means for supplying liquid to it and for withdrawing liquid from it, and means for removing solid matter from the tank, said means comprising a movably mounted conveying carrier and means for swinging it about a path generally concentric with the tank, supported wholly upon the side wall of the tank, a sludge trough situated in the floor of the tank at a point separated from its wall, and a scum hopper mounted adjacent its wall, the liquid level of the tank and adjacent its wall, the conveying carrier carrying a fixed plow adjacent its floor and a movable conveyor adjacent its floor, the two co-operating to move material to the trough in the floor of the tank, and a fixed skimmer supported adjacent the liquid surface upon the conveying carrier and shaped to convey and direct floating material away from the center of the tank and toward the scum discharge hopper adjacent the wall of the tank.

3. In combination in a generally circular tank having a floor and a wall and adapted to contain sewage and liquid waste, means for supplying liquid to it and for withdrawing liquid from it, and means for removing solid matter from the tank while leaving the liquid level at the center of the tank free and unobstructed, said means comprising a movably mounted conveying carrier and means for swinging it about the tank, supported upon the side walls of the tank, a sludge trough situated in the floor of the tank at a point separated from its walls, and a scum hopper mounted adjacent the liquid level of the tank and adjacent its wall, the conveying carrier spaced away from the center of the tank adjacent the liquid level and carrying a fixed plow adjacent its floor and a movable conveyor adjacent its floor, the two co-operating to move material to the trough in the floor of the tank, and a fixed skimmer supported adjacent the liquid surface upon the conveying carrier and shaped to direct floating material away from the center of the tank and toward the scum discharge hopper adjacent the walls of the tank.

4. In combination in a tank adapted to contain liquid, means for supplying liquid to it and for withdrawing liquid from said tank, and means for removing scum from the surface of said liquid, said means comprising a movable scum plow positioned at the surface of the liquid within the tank, means for moving it about the tank, and a movable baffle projecting appreciably below the surface of liquid fixed upon and adjacent the outer end of said plow and moving with said plow and an annular scum baffle carried by and inwardly spaced from the edge of the tank.

5. In combination in a tank adapted to contain liquid, means for supplying liquid to it and for withdrawing liquid from said tank, and means for removing scum from the surface of said liquid, said means comprising a movable scum plow positioned at the surface of the liquid within the tank, means for moving it about the tank, and a fixed baffle adjacent the path of the outer end of said plow, a second baffle secured to and moving with said plow and extending well below the surface of the liquid within said tank the movable baffle extending in a direction parallel to the direction of movement of the scum plow and being located between the scum plow and the fixed baffle.

6. In combination in a tank adapted to contain liquid, means for supplying liquid to it and for withdrawing liquid from said tank, and means for removing scum from the surface of said liquid, said means comprising a movable scum plow positioned at the surface of the liquid within the tank, means for moving it about the tank and a fixed scum baffle positioned upon said tank to lie adjacent the path of the outer end of said plow and a movable baffle mounted upon said plow near the outer end of said plow and moving with it.

7. In combination in a tank adapted to contain liquid, means for supplying liquid to it and for withdrawing liquid from said tank, and means for removing scum from the surface of said liquid, said means comprising a movable scum plow positioned at the surface of the liquid within the tank, means for moving it about the tank and a fixed baffle positioned upon said tank adjacent the path of the outer end of said plow and a movable baffle upon said plow mounted adjacent the outer end of said plow and moving with it, said last mentioned baffle extending below the surface of the liquid within the tank and below the fixed baffle.

8. In combination in a tank adapted to contain liquid, means for supplying liquid to it and for withdrawing liquid from said tank, and means for removing scum from the surface of said liquid, said means comprising a movable scum plow positioned at the surface of the liquid within the tank, means for moving it about the tank and a fixed baffle positioned upon said tank adjacent the path of the outer end of said plow, and a plurality of baffles generally perpendicular one to another and mounted upon said plow adjacent the outer end of said plow and moving with said plow, and extending below the surface of the liquid within said tank, and below the fixed baffle said plow and baffles comprising means for collecting and retaining in collected condition a quantity of scum.

9. In a sedimentation tank, a floor and a wall an elongated liquid discharge weir carried by said wall, a fixed baffle supported from said wall in front of and out of contact with the said weir and extending above and below the upper edge thereof, a scum conveying mechanism movable in the tank along the weir and adapted to convey scum toward the said fixed baffle, an auxiliary baffle carried by the said scum conveying mechanism and extending further below the surface of the liquid than does the fixed baffle, said second baffle being movable with the scum discharge mechanism and located between it and the fixed weir.

10. In combination in a tank adapted to contain liquid, means for supplying liquid to it and for withdrawing it, and means for removing solid matter from the tank, said means comprising a movably mounted conveying carrier and means for driving it bodily about the tank, an effluent trough positioned about the upper edge of the tank, a scum conveyor moving with said conveying carrier, a fixed annular scum baffle adjacent said effluent trough, and a movable scum baffle mounted upon and to move with said conveying carrier, said movable baffle projecting substantially below the lower margin of said fixed baffle, and below the level of scum occurrence and collection.

11. In combination with a settling tank, having a continuous encircling wall, a floor, liquid influent and effluent passages, and a sludge hopper in the floor of the tank far removed from the wall, a cantilever bridge supported entirely on the wall, extending inwardly in the tank above and out of contact with the floor, movable supporting means on the wall for the cantilever bridge and means for moving said supporting means to cause the bridge to move along the wall and to sweep across the floor, means carried by the bridge for propelling settled sludge inwardly along the floor of the tank to the sludge hopper.

12. In combination with a settling tank, having a continuous encircling wall, a floor, liquid influent and effluent passages, and a sludge hopper in the floor of the tank far removed from the wall, a cantilever bridge supported entirely on the wall, extending inwardly in the tank above and out of contact with the floor, movable supporting means on the wall for the cantilever bridge and means for moving said supporting means to cause the bridge to move along the wall and to sweep across the floor, means carried by the bridge for propelling scum outwardly along the surface of the liquid in the tank toward the tank wall.

13. In combination with a settling tank, having a continuous encircling wall, a floor, liquid influent and effluent passages, and a sludge hopper in the floor of the tank far removed from the wall, a cantilever bridge supported entirely on the wall, extending inwardly in the tank above and out of contact with the floor, movable supporting means on the wall for the cantilever bridge and means for moving said supporting means to cause the bridge to move along the wall and to sweep across the floor, means carried by the bridge for propelling settled sludge inwardly along the floor of the tank to the sludge hopper, means carried by the bridge for propelling scum outwardly along the surface of the liquid in the tank toward the tank wall.

14. In combination with a settling tank, having a continuous encircling wall, a floor, liquid influent and effluent passages, and a sludge hopper in the floor of the tank far removed from the wall, a cantilever bridge supported entirely on the wall, extending inwardly in the tank above and out of contact with the floor, movable supporting means on the wall for the cantilever bridge and means for moving said supporting means to cause the bridge to move along the wall and to sweep across the floor, means carried by the bridge for propelling settled sludge inwardly along the floor of the tank to the sludge hopper, the bridge supporting means including tracks at the top of the wall and along the inner periphery but adjacent the bottom of the wall and rollers traveling along said tracks, the rollers engaging the track at the top of the wall engaging both the top and the outer side of the track.

GEORGE L. MOREHEAD.